(12) United States Patent
Quigley (10) Patent No.: US 9,800,909 B2
(45) Date of Patent: *Oct. 24, 2017

(54) METHOD AND APPARATUS FOR DOWNLOADING CONTENT USING CHANNEL BONDING

(71) Applicant: Avago Technologies General IP (Singapore) Pte. Ltd., Singapore (SG)

(72) Inventor: Thomas J. Quigley, Franklin, NC (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 693 days.

This patent is subject to a terminal disclaimer.

(21) Appl. No.: 13/735,930

(22) Filed: Jan. 7, 2013

(65) Prior Publication Data

US 2013/0125180 A1    May 16, 2013

Related U.S. Application Data (63) Continuation of application No. 11/098,612, filed on Apr. 5, 2005, now Pat. No. 8,351,468.

(Continued)

(51) Int. Cl.
*H04N 21/25* (2011.01)
*H04J 3/16* (2006.01)
(Continued)

(52) U.S. Cl.
CPC ........... *H04N 21/25* (2013.01); *H04J 3/1694* (2013.01); *H04N 21/4263* (2013.01);
(Continued)

(58) Field of Classification Search
CPC .......................... H04J 3/1694; H04N 21/4263
See application file for complete search history.

(56) References Cited

U.S. PATENT DOCUMENTS

| 5,815,488 A | 9/1998 | Williams et al. |
| 5,867,485 A | 2/1999 | Chambers et al. |

(Continued)

FOREIGN PATENT DOCUMENTS

| CN | 1504034 A | 6/2004 |
| WO | WO 2006/050174 A2 | 5/2006 |

OTHER PUBLICATIONS

Tse, D.N.C. et al., "*Statistical Multiplexing of Multiple Time-Scale Markov Streams*," IEEE Journal on Selected Areas in Communication 13(6): 1028-1038, IEEE (Aug. 1995).

(Continued)

*Primary Examiner* — Albert T Chou
(74) *Attorney, Agent, or Firm* — Sterne, Kessler, Goldstein & Fox P.L.L.C.

(57) ABSTRACT

As additional channels are added to a communication system for applications, such as standard density (SD) and eventually high density (HD) Video on Demand (VOD), additional capacity can be realized by reducing the time required to transmit content. A reduction of transmission time (or an increase of the transmission rate) can be achieved by bonding chancels of the communication system. The bonded channels typically provide a statistical multiplexing gain because the additional bandwidth is treated as a large single channel for the download. Bonding channels of the communication system can provide high speed downloading of content, such as video content, far in excess of the playback rate. Using bonded channels can relax the Quality of Service (QoS) requirements of a data stream, such as a video stream, over an internet protocol (IP) network.

20 Claims, 11 Drawing Sheets

Related U.S. Application Data (60) Provisional application No. 60/559,037, filed on Apr. 5, 2004.

(51) Int. Cl.
*H04N 21/426* (2011.01)
*H04N 21/438* (2011.01)
*H04N 21/472* (2011.01)
*H04N 21/61* (2011.01)

(52) U.S. Cl.
CPC ... *H04N 21/4383* (2013.01); *H04N 21/47202* (2013.01); *H04N 21/6118* (2013.01); *H04N 21/6156* (2013.01)

(56) References Cited

U.S. PATENT DOCUMENTS

| | | | |
|---|---|---|---|
| 6,151,636 | A | 11/2000 | Schuster et al. |
| 6,272,127 | B1 | 8/2001 | Golden et al. |
| 6,516,192 | B1 | 2/2003 | Spaur et al. |
| 6,563,831 | B1 | 5/2003 | Dally et al. |
| 6,741,575 | B1 | 5/2004 | Zhang et al. |
| 6,763,025 | B2 | 7/2004 | Leatherbury et al. |
| 6,834,057 | B1 | 12/2004 | Rabenki et al. |
| 6,865,154 | B1 | 3/2005 | Charny et al. |
| 6,876,669 | B2 | 4/2005 | Shalom |
| 6,898,182 | B1 | 5/2005 | Cloonan |
| 6,917,591 | B2 | 7/2005 | St. John |
| 6,993,353 | B2 | 1/2006 | Desai et al. |
| 7,023,871 | B2 | 4/2006 | Lind et al. |
| 7,047,553 | B1 | 5/2006 | Cloonan et al. |
| 7,113,484 | B1 | 9/2006 | Chapman et al. |
| 7,130,314 | B2 | 10/2006 | Bunn et al. |
| 7,167,684 | B2 | 1/2007 | Kadous et al. |
| 7,173,901 | B2 | 2/2007 | Pauwels et al. |
| 7,184,713 | B2 | 2/2007 | Kadous et al. |
| 7,194,009 | B2 | 3/2007 | Eng |
| 7,209,442 | B1 | 4/2007 | Chapman |
| 7,412,212 | B2 | 8/2008 | Hottinen |
| 7,450,579 | B2 | 11/2008 | Howard et al. |
| 7,480,247 | B2 | 1/2009 | Shimojo et al. |
| 7,684,425 | B2 | 3/2010 | Thesling |
| 7,782,898 | B2 | 8/2010 | Chapman et al. |
| 7,792,034 | B2 | 9/2010 | Prodan et al. |
| 7,894,343 | B2 | 2/2011 | Chao et al. |
| 8,130,642 | B2 | 3/2012 | Howard et al. |
| 8,351,468 | B2 * | 1/2013 | Quigley .................. 370/486 |
| 2002/0106029 | A1 | 8/2002 | Bunn et al. |
| 2002/0131425 | A1 | 9/2002 | Shalom |
| 2002/0191542 | A1 | 12/2002 | Gerard Pauwels et al. |
| 2003/0058890 | A1 | 3/2003 | Ritchie, Jr. et al. |
| 2003/0206554 | A1 | 11/2003 | Dillon |
| 2003/0236080 | A1 | 12/2003 | Kadous et al. |
| 2004/0066743 | A1 | 4/2004 | Shimojo et al. |
| 2004/0133925 | A1 | 7/2004 | Franceschini et al. |
| 2004/0163129 | A1 | 8/2004 | Chapman et al. |
| 2004/0218623 | A1 | 11/2004 | Goldenberg et al. |
| 2005/0002334 | A1 | 1/2005 | Chao et al. |
| 2005/0052992 | A1 | 3/2005 | Cloonan et al. |
| 2005/0135419 | A1 * | 6/2005 | Pullen et al. ............ 370/473 |
| 2005/0198685 | A1 | 9/2005 | Walston |
| 2005/0245197 | A1 | 11/2005 | Kadous et al. |
| 2006/0117363 | A1 | 6/2006 | Lee et al. |
| 2006/0182139 | A1 | 8/2006 | Bugajski et al. |
| 2006/0256772 | A1 | 11/2006 | Yarlagadda |
| 2007/0098007 | A1 | 5/2007 | Prodan et al. |
| 2007/0116152 | A1 | 5/2007 | Thesling |
| 2010/0296511 | A1 | 11/2010 | Prodan et al. |
| 2012/0269192 | A1 | 10/2012 | Howard et al. |

OTHER PUBLICATIONS

Lee, C.C. and Bertorelle, J., "*System-level Capacity an QoS in DOCSIS1.1 Upstream*," paper presented at Society of Cable Telecommunication Engineers (SCTE) Emerging Technology Conference, 2002, 27 pages.

International Search Report dated Sep. 11, 2006, issued in International Application No. PCT/US05/39105.

Non-Final Office Action mailed Nov. 20, 2007, for U.S. Appl. No. 10/936,711, filed Sep. 9, 2004, 7 pages.

Notice of Allowance mailed Jul. 2, 2008, for U.S. Appl. No. 10/936,711, filed Sep. 9, 2004, 7 pages.

Non-Final Office Action mailed May 20, 2010, in U.S. Appl. No. 12/258,585, filed Oct. 27, 2008, 9 pages.

Non-Final Office Action mailed Dec. 1, 2010, in U.S. Appl. No. 12/258,585, filed Oct. 27, 2008, 8 pages.

Final Office Action mailed Apr. 18, 2011, in U.S. Appl. No. 12/258,585, filed Oct. 27, 2008, 7 pages.

Notice of Allowance mailed Oct. 31, 2011, in U.S. Appl. No. 12/258,585, filed Oct. 27, 2008, 5 pages.

Supplemental Notice of Allowance mailed Nov. 4, 2011, in U.S. Appl. No. 12/258,585, filed Oct. 27, 2008, 2 pages.

Non-Final Office Action mailed May 27, 2009, for U.S. Appl. No. 11/261,652, filed Oct. 31, 2005, 7 pages.

Non-Final Office Action mailed Sep. 8, 2008, for U.S. Appl. No. 11/261,652, filed Oct. 31, 2005, 8 pages.

Notice of Allowance mailed Dec. 3, 2009, for U.S. Appl. No. 11/261,652, filed Oct. 31, 2005, 4 pages.

Notice of Allowance mailed Apr. 2, 2010, for U.S. Appl. No. 11/261,652, filed Oct. 31, 2005, 6 pages.

Non-Final Office Action mailed Feb. 18, 2011, for U.S. Appl. No. 12/847,839, filed Jul. 30, 2010, 7 pages.

Final Office Action mailed Aug. 2, 2011, for U.S. Appl. No. 12/847,839, filed Jul. 30, 2010, 7 pages.

Non-Final Office Action mailed Mar. 13, 2012, for U.S. Appl. No. 12/847,839, filed Jul. 30, 2010, 5 pages.

Notice of Allowance mailed Aug. 9, 2012, for U.S. Appl. No. 12/847,839, filed Jul. 30, 2010, 5 pages.

Non-Final Office Action mailed May 19, 2008, for U.S. Appl. No. 11/098,612, filed Apr. 5, 2005, 9 pages.

Final Office Action mailed Dec. 16, 2008, for U.S. Appl. No. 11/098,612, filed Apr. 5, 2005, 12 pages.

Notice of Allowance mailed Aug. 30, 2012, for U.S. Appl. No. 11/098,612, filed Apr. 5, 2005, 5 pages.

Extended European Search Report directed toward EP Application No. 05825041.6, dated Apr. 15, 2013; 5 pages.

Motorola, "Motorola SmartStream Encryptor Modulator," retrieved from the Internet at http://broadband.motorola.com/catalog/product_documents/SEM_wp_july03.pdf [retrieved on Sep. 26, 2011]; 10 pages.

* cited by examiner

METHOD AND APPARATUS FOR DOWNLOADING CONTENT USING CHANNEL BONDING

CROSS REFERENCE TO RELATED APPLICATIONS

This application claims benefit as a continuation to pending U.S. patent application Ser. No. 11/098,612, filed Apr. 5, 2005, entitled "METHOD AND APPARATUS FOR DOWNLOADING CONTENT USING CHANNEL BONDING," which claims priority to Provisional Patent Application No. 60/559,037, filed on Apr. 5, 2004, both of these applications are hereby incorporated by reference as if fully set forth herein.

BACKGROUND OF THE INVENTION

Field of the Invention

The present invention generally relates to communication systems, and more specifically to downloading content in a communication system.

Background

The present invention addresses issues relating to communication systems, and specifically point-to-multipoint communication systems. In conventional point-to-multipoint communication systems, a network supports bidirectional data communication between a central entity and multiple customer premises equipment (CPE). Example point-to-multipoint communication systems include cable modem systems, fixed wireless systems, and satellite communication systems. In each system, the communication path from the central entity to the CPE is typically referred to as the downstream, while the communication path from the CPE to the central entity is typically referred to as the upstream.

One type of point-to-multipoint system is a cable modem system, which typically includes a headend that is capable of communicating with multiple CPEs, each of which provides cable modem functionality. In a cable modem system, the CPE can be a cable modem, a settop box, or a cable gateway, to provide some examples.

DOCSIS (Data Over Cable Service Interface Specification) refers to a group of specifications published by CableLabs® that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems. The current version of the DOCSIS specification is version 2.0, and includes the DOCSIS Radio Frequency Interface (RFI) Specification SP-RFIv2.0-I03-021218 (hereinafter. "DOCSIS RFI Specification"), the entirety of which is incorporated by reference herein.

DOCSIS supports the ITU-T J.83 B (hereinafter "Annex B") standard for downstream physical (PHY) layer transmissions from the headend to cable modems. Advances in communication technology are requiring increasingly more bandwidth, which can lead to deficiencies in channel capacity, especially with respect to these downstream transmissions. For example, even cable plants operating at a frequency of 750 MHz are being challenged with capacity shortages, due to increased demand for video on demand (VOD), high-definition television (HDTV), digital services, and expanding analog channel lineups. Numerous schemes have been proposed to help alleviate the downstream bandwidth issues, including analog spectrum reclamation and advanced video coding techniques.

What is needed is a method and apparatus for downloading content in a communication system that addresses one or more of the aforementioned shortcomings of conventional communication systems and methods.

BRIEF SUMMARY OF THE INVENTION

The present invention provides a method and apparatus for downloading content, such as video on demand (VOD) content. In particular, an embodiment of the present invention provides a method and apparatus for downloading content via channel bonding in a communication system, wherein a central entity transmits the content to remote devices via multiple channels. The central entity can transmit portions of the content via different channels based on a relationship between the channels or a capability of the remote device, to provide some examples.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only Additional embodiments will be apparent to persons skilled in the relevant art(s) based on the teachings contained herein.

BRIEF DESCRIPTION OF THE DRAWINGS/FIGURES

The present invention is described with reference to the accompanying drawings. In the drawings, like reference numbers indicate identical or functionally similar elements. Additionally, the left most digit(s) of a reference number identities the drawing in which the reference number first appears.

DETAILED DESCRIPTION OF THE INVENTION

Although the embodiments of the invention described herein refer specifically, and by way of example, to cable modem systems, including cable modem termination systems and cable modems it will be readily apparent to persons skilled in the relevant art(s) that the invention is equally applicable to other communication systems, including but not limited to satellite systems, optical communications systems, telephone, wire, systems, and/or any combination thereof. It will also be readily apparent to persons skilled in the relevant art(s) that the invention is applicable to any point-to-multipoint system.

Figure 1:
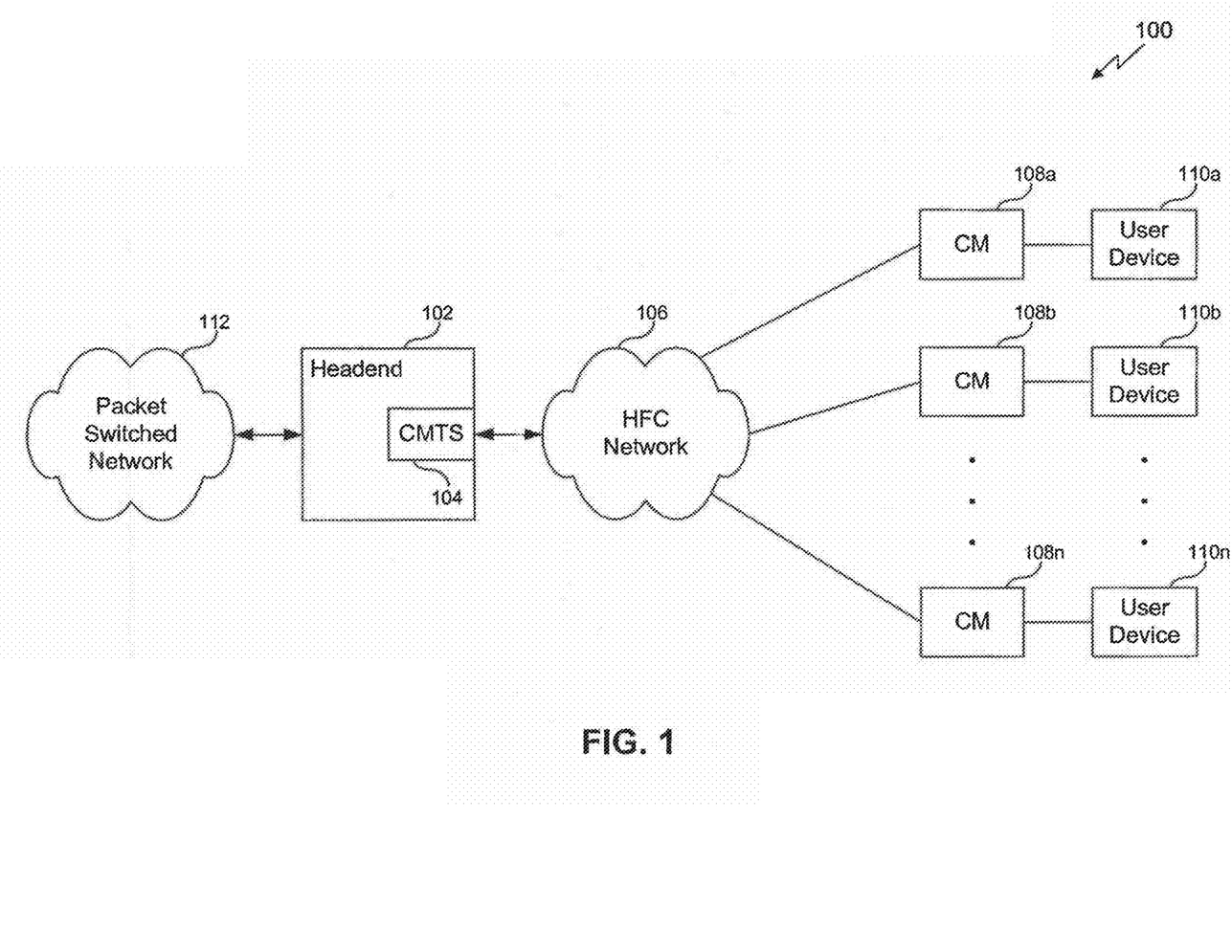
FIG. 1 illustrates a high-level block diagram of an example communication system according to an embodiment of the present invention.

FIG. 1 illustrates a high-level block-diagram of an example communication system according to an embodiment of the present invention. The communication system 100 enables voice communications, video, and/or data services based on a bi-directional transfer of packet-based traffic, such as Internet Protocol (IP) traffic, between a cable system headend 102 and a plurality of cable modems 108a-108n via a communications network 106, which, by way of example, may comprise a hybrid fiber coaxial (HFC) network.

The cable headend 102 generally includes at least one cable modem-termination system (CMTS) 104. The CMTS 104 is a portion of the cable headend 102 that manages the upstream and downstream transfer of data between the cable headend 102 and the cable modems 108a-108n, which can be located at respective customer premises. The CMTS 104 broadcasts information downstream to the cable modems 108a-108n as a continuous transmitted signal in accordance with a time division multiplexing (TDM) technique. Additionally, the CMTS 104 receives data from the cable modems 108a-108n over a plurality of shared upstream channels. Data from the cable modems 108a-108n is transmitted upstream in accordance with a time domain multiple access (TDMA) technique or a synchronous code division multiple access (S-CDMA) technique.

As shown in FIG. 1, the CMTS 104 further serves as an interface between the HFC network 106 and a packet switched network 112, transferring packets received from the cable modems 108a-108n to the packet switched network 112 and transferring packets received from the packet switched network 112 to the cable modems 108a-108n when appropriate. The packet switched network 112 can include the Internet, for example.

In addition to the CMTS 104, the cable headend 102 can include one or more routers to facilitate the connection between the CMTS 104 and the packet switched network 112, as well as one or more servers for performing necessary network management tasks. The headend 102 can also include one or more satellite receivers, video modulators, and/or telephone switches, to provide other examples.

The HFC network 106 provides a point-to-multipoint topology for the high speed, reliable, and secure transport of data between the cable headend 102 and the cable modems 108a-108n. As will be appreciated by persons skilled in the relevant art(s), the HFC network 106 can include coaxial cable, fiber optic cable, or a combination of coaxial cable and fiber optic cable linked via one or more fiber nodes, can include frequency translation devices in support of a frequency stacking architecture, and can even include wireless links, for example.

Each of the cable modems 108a-108n operates as an interface between the HFC network 106 and at least one attached user device 110. In particular, the cable modems 108a-108n convert downstream signals received over the HFC network 106 into IP data packets to be received by an attached user device 110. Additionally, the cable modems 108a-108n convert IP data packets received from the attached user device 110 into upstream burst signals suitable for transfer over the HFC network 106.

Referring to FIG. 1, each cable modem 108a-108n is shown supporting only a single user device 110 for the sake of clarity. However, each cable modem 108a-108n is generally capable of supporting a plurality of user devices 110 for communication over the communication system 100. A user device 110 can be a personal computer, data terminal equipment, telephony device, broadband media player, network controlled appliance, or any other device capable of transmitting or receiving data over a packet switched network.

In an embodiment, cable modems 108a-108n and CMTS 104 represent DOCSIS-compliant cable modem equipment. In other words, cable modems 108a-108n and CMTS 104 are adapted to communicate in accordance with protocols and/or formats provided in the DOCSIS specification.

Figure 2:
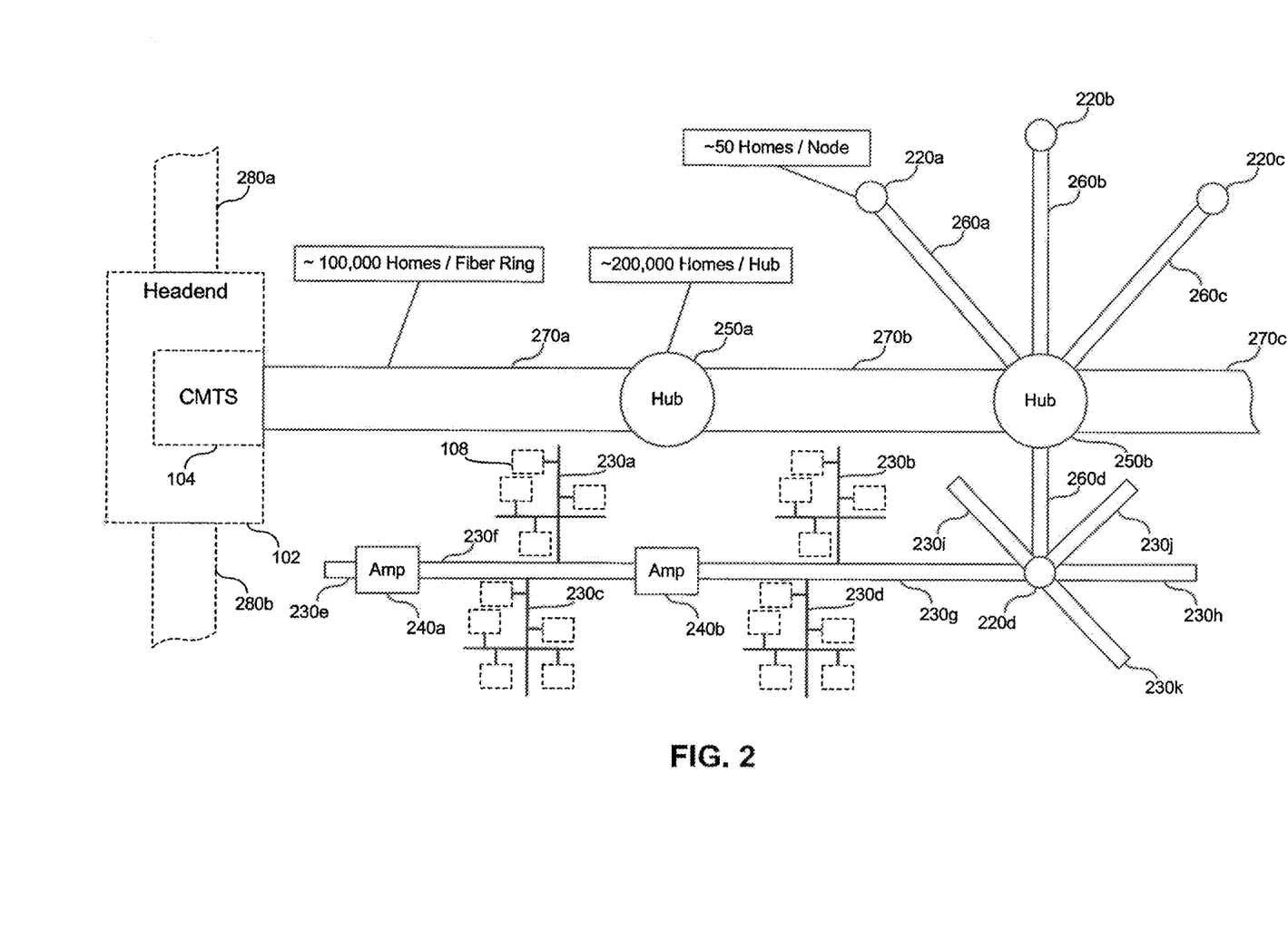
FIG. 2 illustrates a schematic diagram of an example hybrid fiber coaxial (HFC) network showing typical pathways for data transmissions between a headend and a plurality of cable moderns according to an embodiment of the present invention.

FIG. 2 illustrates a schematic diagram of an example hybrid fiber coaxial (HFC) network to facilitate transmission of data between a headend and a plurality of cable modems according to an embodiment of the present invention. For example, an HFC network 106 is often used by a cable provider to provide Internet access, cable television, and/or pay-per-view programming to subscribers.

In FIG. 2, approximately 50 cable modems 108 are in electrical communication with each node 220 of the HFC network 106 for illustrative purposes. Cable modems 108 are typically connected to a node 220 via coaxial cables 230. The HFC network 106 can include amplifiers 240 to facilitate the electrical connection of the more distant cable modems 108, for example, to the nodes 220. Amplifying the electrical signals can desirably enhance the signal-to-noise ratio (SNR) of communications between the headend 102 and the cable modems 108. Coaxial cables 230a-230d electrically connect the cable modems 108 with coaxial cables 230f, 230g, which extend between amplifiers 240 and nodes 220.

Each node 220 is electrically connected to a hub 250, typically via an optical fiber 260. The hubs 250 are in communication with the headend 102 via optical fibers 270. Each hub 250 is generally capable of facilitating communication with 20,000 cable modems 108.

The optical fibers 270 extending intermediate the headend 102 and each hub 250 define a fiber ring, which is typically capable of facilitating communication between approximately 100,000 cable modems 108 and the headend 102. The headend 102 can communicate via transmission line 280 with the Internet, another headend, and/or any other suitable device(s) or network. The transmission line 280 can be a T1 line or a T2 line, to provide some examples.

Figure 3:
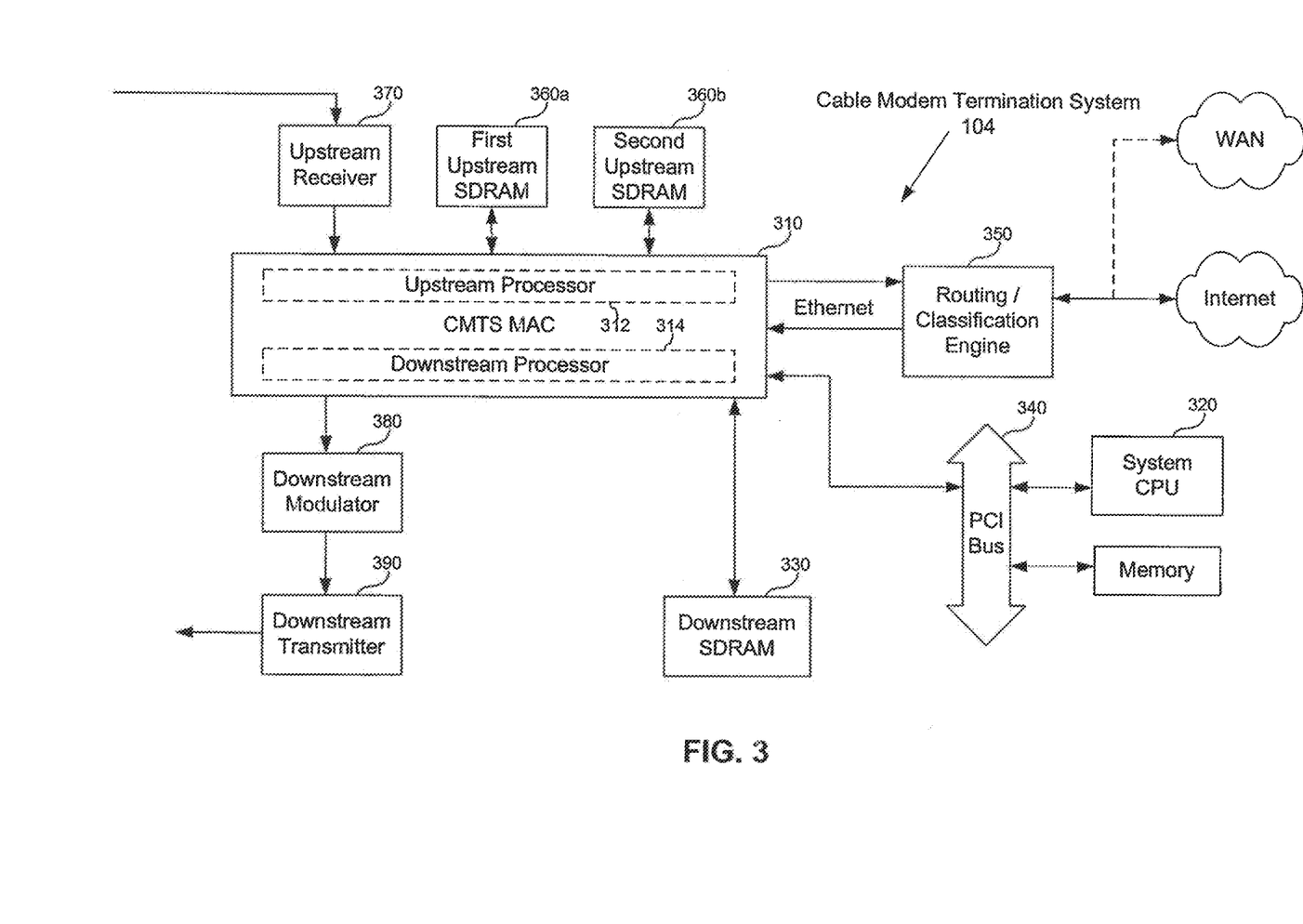
FIG. 3 illustrates a block diagram of an example cable modem termination system (CMTS) according to an embodiment of the present invention.

FIG. 3 illustrates a block diagram of an exemplary implementation of a CMTS 104 of the communication system 100. This exemplary implementation is presented by way of example, and is not intended to limit the scope of the present invention. The CMTS 104 processes signals both at a physical (PHY) layer and at a media access control (MAC) layer. The CMTS 104 includes a CMTS MAC 310, which provides hardware support for MAC layer per-packet functions, such, as fragmentation, concatenation, and payload header suppression. Providing such support reduces the amount of processing required of a system central processing unit (CPU) 320, which serves to improve the overall performance of the CMTS 104.

An upstream processor 312 of the CMTS MAC 310 performs data encryption standard (DES) decryption, fragment reassembly, de-concatenation, payload packet expansion, packet acceleration, upstream management information base (MIB) statistic gathering, and/or priority queuing for the resultant packets. Each output queue is independently configured to provide packets to a personal computer interface (PCI) or a gigabit media independent interface (GMII) (not shown).

A downstream processor 314 of the CMTS MAC 310 accepts packet from priority queues and performs payload header suppression, DOCSIS header creation, DES encryption, cyclic redundancy checking (CRC), header check sequence (HCS) creation in accordance with the DOCSIS specification, Moving Pictures Experts Group (MPEG) encapsulation, and/or multiplexing. In an embodiment, a downstream synchronous dynamic random access memory SDRAM 330 is used to support packaging, handling, and storage of output queues received from the CMTS MAC 310.

In an embodiment, the CMTS MAC 310 is configured and managed externally via a PCI interface (not shown) and a PCI bus 340. Alternatively, the CMTS MAC 310 can be operated remotely using a routing/classification engine 350 that is located externally to the CMTS MAC 310.

According to an embodiment, first and second upstream SDRAMs 360 are used to minimize latency on the internal buses. For example, in an embodiment, the first upstream SDRAM 360a is operable to support keys and reassembly, and the second upstream SDRAM 360b is operable to support packet header suppression (PHS) and output queues.

A Serial Peripheral Interface (SPI) master port (not shown) is employed to control the interface between MAC layer components and PHY layer components. For example, the SPI master port can be used to control the interface between the CMTS MAC 310 and the upstream receiver 370 and/or between the CMTS MAC 310 and the downstream modulator 380.

The CMTS MAC 310 generates data which is modulated and then transmitted to one or more cable modems 108. For example, data generated by CMTS MAC 310 can be modulated onto a carrier signal by downstream modulator 380 and then transmitted downstream by downstream transmitter 390. The upstream receiver 370 receives information from the cable modems 108 in bursts of TDMA- or S-CDMA-encoded packets.

Upon receipt of a transmission from a cable modem 108, the CMTS 104 can assign a service identifier (SID) to the cable modem 108. The cable modem 108 typically sends a ranging request to the CMTS 104. The ranging request often includes a request for the CMTS 104 to assign a SID to the cable modem 108. Upon receipt of this request, the CMTS 108 assigns a SID to the cable modem 108. Because the CMTS 104 can generally change the SID that is initially assigned to the cable modem 108, the SID initially assigned to the cable modem 108 by the CMTS 104 is sometimes referred to as a temporary SID.

The CMTS 108 generally assigns the SID to the cable modem 108 by sending a "ranging response message" to the cable modem 108. The ranging response message can include the original full address of the cable modem. The temporary SID can be a 14-bit address, for example, and typically enables the CMTS 104 to address the cable modem 108 in a bandwidth allocation message.

The CMTS 104 can generate the SID based on the MAC address of the cable modem 108. The MAC address of the cable modem 108 is traditionally a 48-bit value. The SID generally has fewer than 48-bits, though the SID can include any suitable number of bits. For instance, the SID can be a 14-bit value.

A memory can store a lookup table that includes the MAC addresses of the cable modems 108. For example, the CMTS 104 can associate a SID of a cable modem 108 with an address of the lookup table that includes the MAC address of the cable modem 108. In an embodiment, the SIDs are addresses of the lookup table, corresponding to MAC addresses of the cable modems 108. For example, a CMTS 104 can determine the MAC address, of a cable modem 108 by using the STD that is associated with that cable Modem 108.

The CMTS 104 can associate a SID with more than one cable modem 108. For instance, a SID can indicate a range of addresses of the lookup table or an address of the lookup table that corresponds to multiple MAC addresses. The CMTS 104 can assign a SID that is associated with a particular time slot to multiple cable modems 108, so that cable modems 108 can contend for transmission in that slot. On the other hand, if a time slot is a unicast time slot, then the CMTS 104 assigns the time slot to only one cable modem 108.

Figure 4:
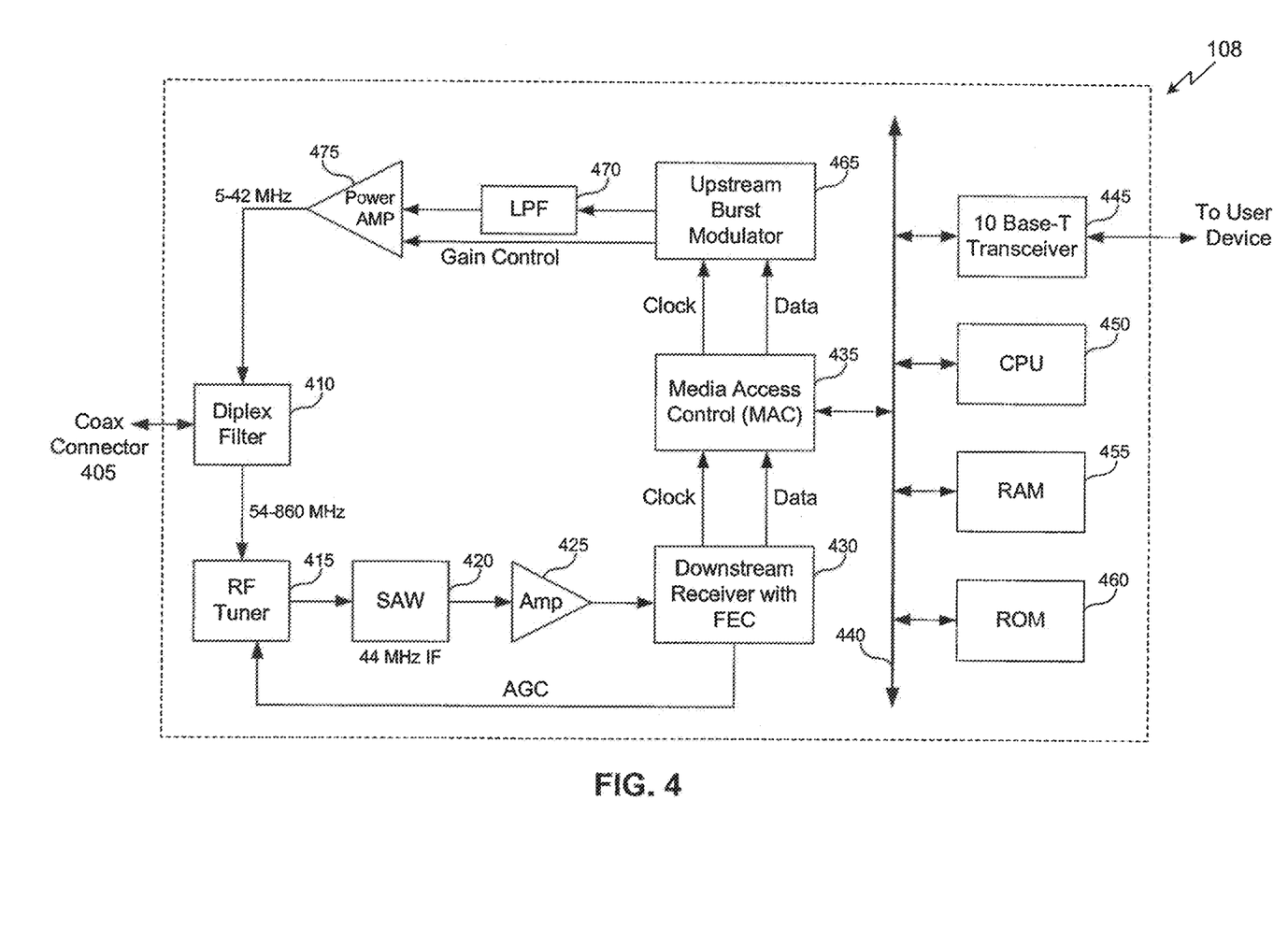
FIG. 4 illustrates a schematic block diagram of an implementation of a cable modem according to an embodiment of the present invention.

FIG. 4 illustrates a schematic block diagram of an exemplary implementation of a cable modem 108 of the communication system 100. This exemplary implementation is presented by way of example, and is not intended to limit the present invention. The cable modem 108 is configured to receive and transmit signals to and from the HFC network 106 via coaxial connector 405. Accordingly, the cable modem 108 will be described in terms of a receiver portion and a transmitter portion.

The receiver portion includes a diplex filter 410, a radio frequency (RF) tuner 415, a surface acoustic wave (SAW) filter 420, an amplifier 425, and a downstream receiver 430. Reception begins with the diplex filter 410 receiving a downstream signal originating from the CMTS 104. The diplex filter isolates the downstream signal and routes the signal to the RF tuner 415. In an embodiment, the downstream signal has spectral characteristics in the frequency range of approximately 54-860 MHz. The RF tuner 415 downconverts the signal and provides the downconverted signal to the SAW filter 420, which passes only spectral components of the downconverted signal that are within a particular bandwidth. The amplifier 425 amplifies the filtered signal and passes it to the downstream receiver 430. Automatic gain controls can be provided from the downstream receiver 430 to the RF tuner 415.

The downstream receiver 430 demodulates the amplified signal. For example, the downstream receiver 430 can demodulate the amplified signal in accordance with a quadrature amplitude modulation (QAM) technique, such as 64-QAM or 256-QAM, to recover the underlying information signal. The downstream receiver 430 also converts the underlying information signal from an analog form to digital form. The downstream receiver 430 then provides the digitized underlying information to a media access control (MAC) 435.

The MAC 435 processes the digital data, which may include, for example, Ethernet packets for transfer to an attached user device. The functions of the MAC 435 can be implemented in hardware or in software. In the example implementation of FIG. 4, the functions of the MAC 435 are implemented in both hardware and software. The random access memory (RAM) 455 and/or the read-only memory (ROM) 460 can store software functions of the MAC 435. The CPU 450 can execute the software functions of the MAC 435. The MAC 435 is in electrical communication with the CPU 450, the RAM 455, and the ROM 460 via a shared communications medium 440. The shared communications medium can include a computer bus or a multiple access data network, to provide some examples.

Referring to FIG. 4, the MAC 435 is further in electrical communication with an Ethernet interface 445 via the shared communications medium 440. When appropriate, the MAC 435 can transfer Ethernet packets received from the downstream receiver 430 to the Ethernet interface 445 for transfer to an attached user device.

The transmitter portion of the cable modem 108 includes an upstream burst modulator 465, a low pass filter 470, a power amplifier 475, and the diplex filter 410. Transmission begins with the MAC 435 receiving a data packet. The data packet can include data originally received from an attached user device via the Ethernet interface 445, for example. In another example, the data packet can be generated by the MAC 435 as part of the cable modem network management and upkeep. The MAC 435 formats the data packet in compliance with the protocols set forth in the DOCSIS specification. The MAC 435 provides the data packet to the upstream burst modulator 465, which converts the data packet into analog form and modulates the data packet onto a carrier signal in accordance with a particular modulation technique. The modulation technique can include, without limitation, a Quadrature Phase Shift Key (QPSK) technique, an 8-QAM technique, a 16-QAM technique, a 32-QAM technique, or a 64-QAM technique, to provide some examples.

The upstream burst modulator 465 provides the modulated carrier signal to the low pass filter (LPF) 470, which generally passes signals with spectral characteristics in a desired bandwidth within the frequency range of approximately 5-42 MHz. The power amplifier 475 amplifies the filtered signal received from the LPF 470 and provides the amplified signal to the diplex filter 410. The upstream burst modulator 465 typically regulates the gain of the power amplifier 475. The diplex filter 410 isolates the amplified signal and transmits the amplified signal upstream over the HFC network 106 during a scheduled burst opportunity.

Figure 5:
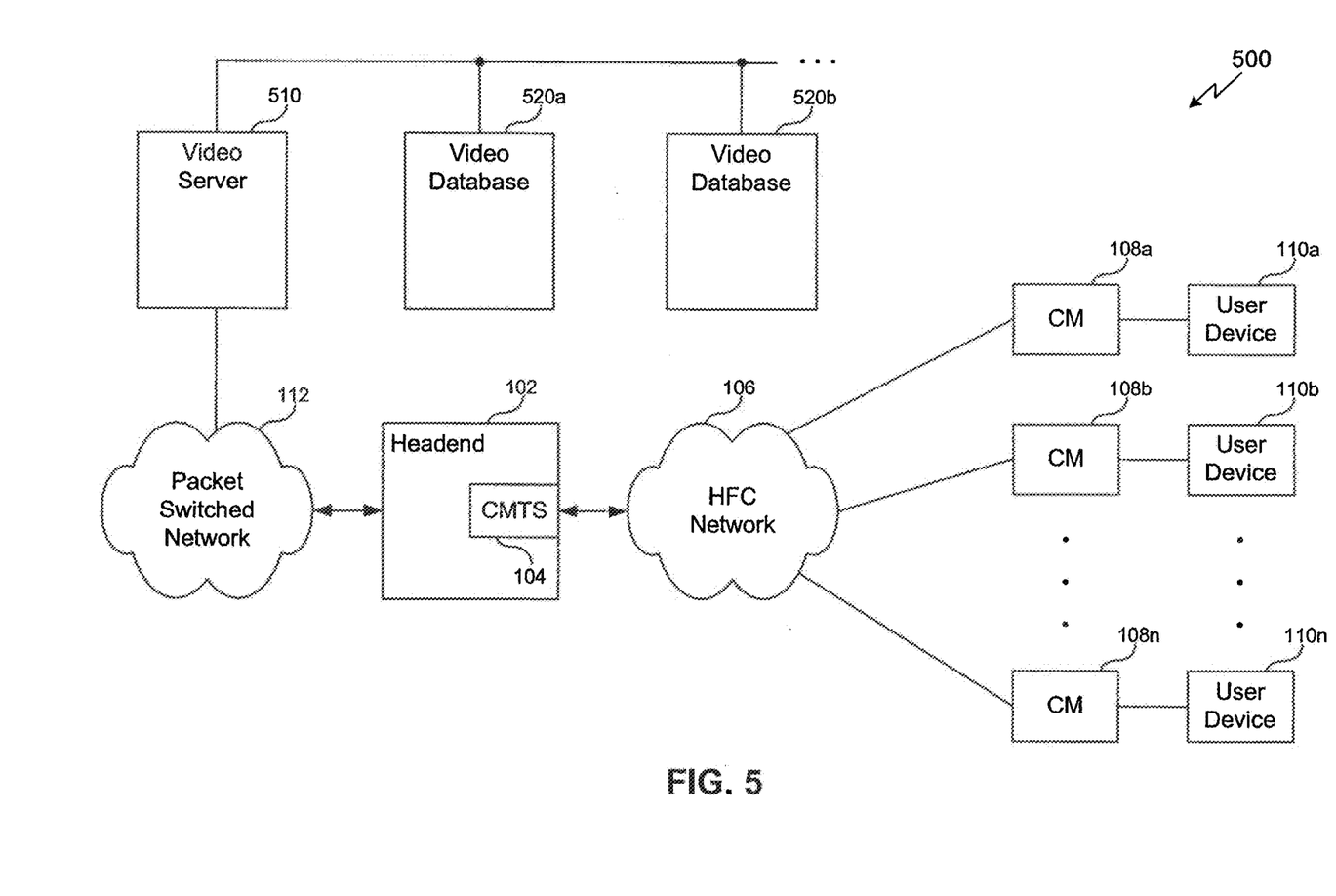
FIG. 5 illustrates a high-level block diagram of another example communication system according to an embodiment of the present invention.

Referring to FIG. 5, a communication system 500 in accordance with an embodiment of the present invention includes a video server 510. The video server 510 provides content, such as video on demand (VOD) content, in response to a request received from a user device 110. In an embodiment, the video server 510 stores the content. The video server 510 can be external to the headend 102, as shown in FIG. 5, or the video server 510 can be included in the headend 102. According to an embodiment, a first portion of the video server 510 is internal to the headend 102, and a second portion of the video server 510 is external to the headend 102. The video server 510 provides capabilities similar to those provided by a conventional videocassette recorder, such as fast forward, rewind, slow motion, pause, and skip ahead. These capabilities are often referred to as "trick modes".

Communication system 500 also includes one or more video databases 520. A video database 520 generally stores content to be accessed by the video server 510. For example, more popular content can be stored in the video server 510, and less popular content can be stored in a video database 520. The communication system 500 of FIG. 5 includes two video databases 520 for illustrative purposes, though the scope of the present invention is not limited in this respect. The communication system 500 can include any suitable number of video databases 520. The video database(s) 520 can be external to the headend 102, as shown in FIG. 5, or the video database(s) 520 can be included in the headend 102. The video server 510 and/or video databases 520 can store content using RAM, ROM, CD-ROM, or a tape drive, to provide some examples.

As additional channels are added to a communication system 100, 500, capacity of the communication system 100, 500 can be increased by reducing the time required to transmit information, such as VOD content. For example, reducing the time required to transmit content from the CMTS 104 to the cable modems 108 can allow the CMTS 104 to transmit to more users at a time. According to an embodiment, reducing the transmission time allows a higher concentration ratio per quadrature amplitude modulation (QAM), or a greater number of users per QAM.

QAM is a modulation technique that is often used to encode content before it is transmitted from the headend to the cable modems. Information in a QAM signal is transmitted in "blocks" of QAM symbols, where each QAM symbol includes n bits of data. A QAM modulation technique in which n bits of data, are included in each symbol is generally referred to as $2^n$ QAM. In Annex B, 64 QAM and 256 QAM signals, for example, can utilize blocks of five symbols each, so that 30 bits and 40 bits are transmitted per block, respectively. The use of 64 QAM and 256 QAM signals in the previous example is for illustrative purposes only, and the scope of the present invention is not limited in this respect. Embodiments of the present invention can utilize any modulation format.

In accordance with an embodiment of the present invention, a reduction of the transmission time (or an increase of the transmission rate) can be achieved by "bonding" channels of the communication system 100, 500. For instance, a remote device can be configured by a central entity or by the remote device itself to receive content via multiple downstream channels at once. The multiple downstream channels can be combined to operate like a single downstream channel having an increased capacity.

Figure 6:
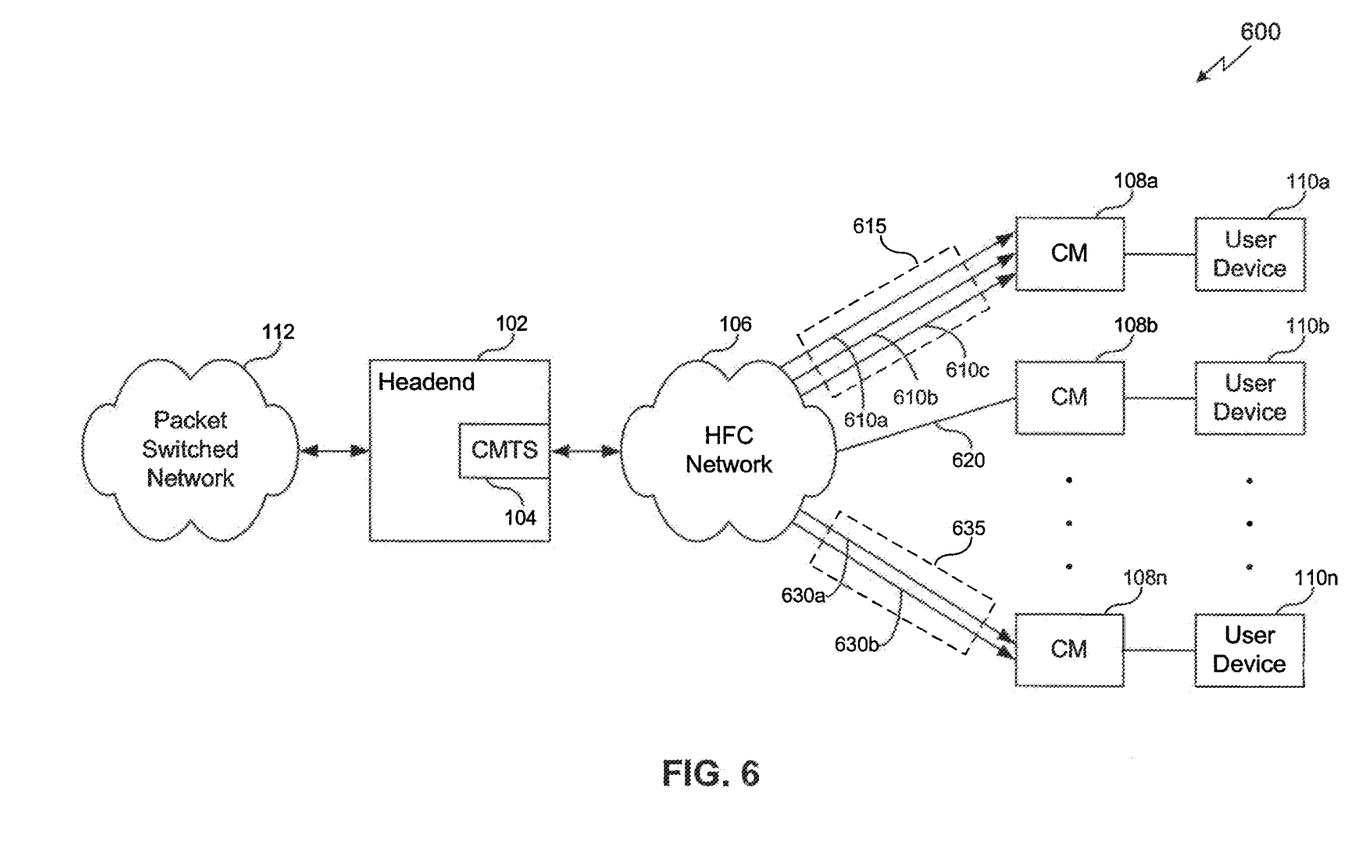
FIG. 6 illustrates a communication system having bonded channels according to an embodiment of the present invention.

FIG. 6 illustrates a communication system having bonded channels according to an embodiment of the present invention. In FIG. 6, three downstream channels 610 between the CMTS 104 and cable modem 108a are bonded, as depicted by dashed box 615. For instance, the headend 102 or the CMTS 104 can configure the channels 610 to concurrently provide content to the cable modem 108a. For exemplary purposes, downstream channel 620 between the CMTS 104 and cable modem 108b is not bonded to another downstream channel. Two downstream channels 630 between the CMTS 104 and cable modem 108n are bonded, as depicted by dashed box 635. Any suitable number of channels can be bonded.

According to an embodiment, a cable modem 108 provides information upstream to the CMTS 104 indicating that the cable modem 108 is capable of receiving information via bonded channels. For example, cable modem 108a can transmit service information including the service identifier (SID) of the cable modem 108a to the CMTS 104, indicating that the cable modem 108a is capable of receiving information via bonded channels. In this example, the CMTS 104 configures channels 610 to allow bonding.

In another embodiment, a cable modem 108 provides information upstream to the CMTS 104 indicating that the cable modem 108 is capable of receiving information via a group of channels, such as channels 610, and the CMTS 104 determines that at least some of the channels are to be bonded. For example, the cable modem 108*a* can transmit information, such as a bonding indicator, indicating that the cable modem 108*a* is capable of receiving information via any of channels 610. As shown in FIG. 6, all of the channels 610 can be bonded, though the scope of the invention is not limited in this respect. The CMTS 104 can configure any combination of two or more of the channels 610 to allow bonding.

A list of cable modems 108 that are capable of receiving information via bonded channels can be stored in a memory of the headend 102, for example. The CMTS 104 can determine which cable modems 108 are capable of receiving information via bonded channels by cross-referencing SIDs of the cable modems 108 with SIDs in the list. If the CMTS 104 determines that packets of information are destined for a cable Modem 108 associated with a SID in the list, the CMTS 104 can transmit the packets to the cable modem 108 in parallel using multiple downstream channels.

Figure 7:
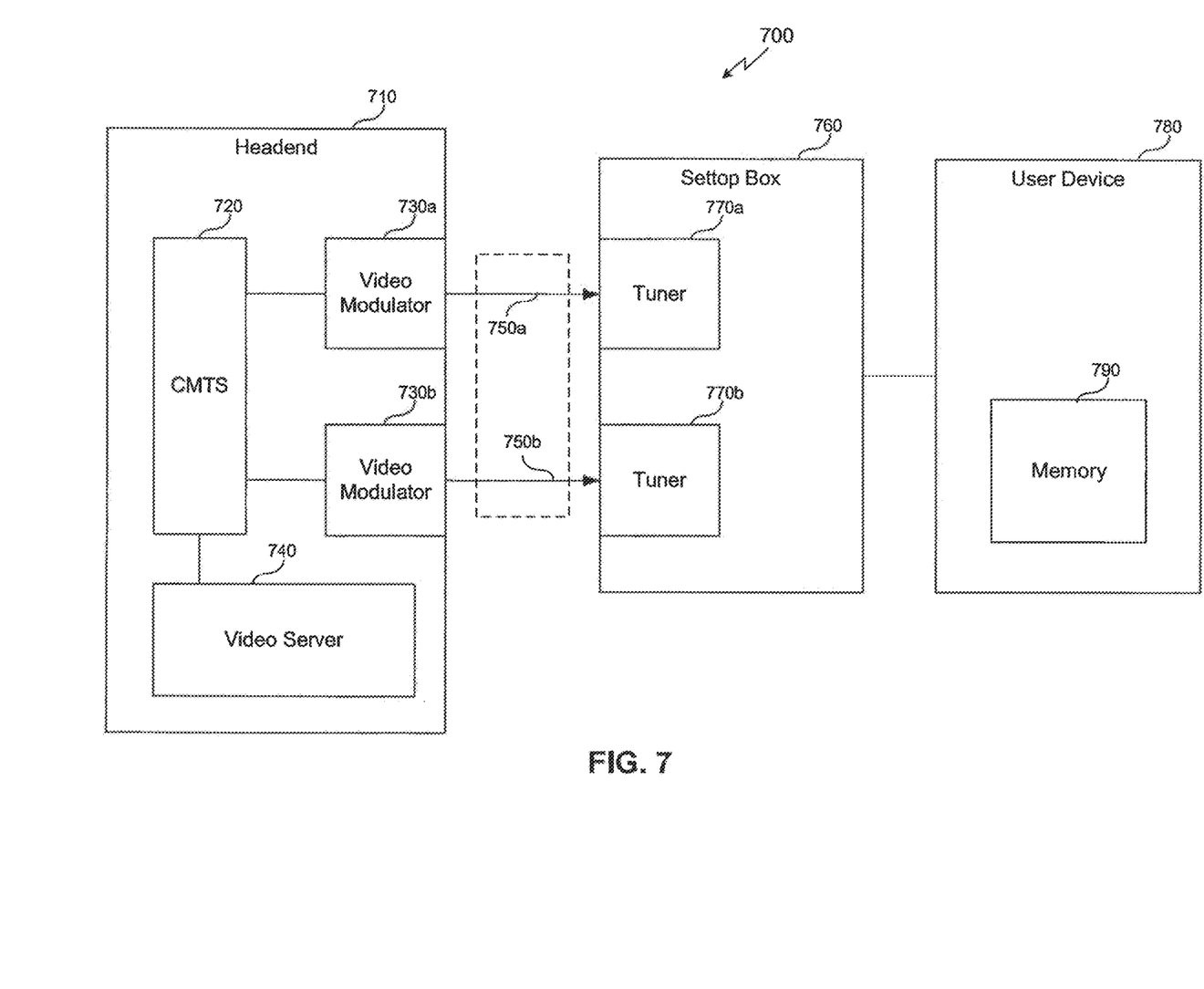
FIG. 7 illustrates another communication system having bonded channels according to an embodiment of the present invention.

Embodiments of the present invention can be implemented using any suitable customer premises equipment (CPE), such as a cable modem, a settop box, or a cable gateway. Moreover, persons of ordinary skill in the art will recognize that embodiments of the present invention are applicable to other types of communication systems in addition to cable modem systems. Referring to FIG. 7, headend 710 transmits content, such as VOD content, downstream via bonded channels 750*a* and 750*b* (hereinafter 750) to settop box 760. The headend 710 is generally capable of performing transmission convergence layer functions for multiple channels, as well as for individual channels. For instance, the headend 710 can perform MPEG2 transmission convergence layer functions for bonded downstream channels 750.

In an embodiment, a user of user device 780 selects an item of content, such as VOD content, from video server 740. The item can be a movie, a television show, or an advertisement, to provide some examples. Headend 710 transmits the item of content via bonded channels 750 in response to identifying settop box 760 as being capable of receiving information via multiple channels. According to one embodiment, the headend 710 matches the SID of the settop box 760 with a SID in a list of SIDs associated with devices having the capability to receive information via bonded channels. In another embodiment, the settop box 760 provides information including a bonding indicator to the headend 710. The bonding indicator indicates that the settop box 760 is configured to receive information via multiple downstream channels.

The item of content generally includes multiple interact protocol (IP) packets. When a packet destined for settop box 760 enters the transmission convergence layer of the CMTS 720, the CMTS 720 parses the packet into MPEG packets, based on the SID and/or the bonding indicator associated with the settop box 760. For instance, the packet that enters the transmission convergence layer can include the SID or the bonding indicator. The CMTS 720 generally enqueues the MPEG packets simultaneously in the queues of the video modulators 730*a* and 730*b* (hereinafter 730) for downstream transmission to the user device 780. As shown in FIG. 7, the headend 710 includes two video modulators 730. The video modulators 730 can be internal to the CMTS 720 or external to the CMTS 720.

Rather than allocating the conventional 3.5 Mbps for standard density (SD) VOD content on a given QAM channel, greater bandwidth can be realized by using bonded channels 750 for transmission of the MPEG packets. For example, transmitting the MPEG packets via two bonded 256 QAM channels can allow 76 Mbps to be utilized to deliver the MPEG packets to the user. In another example, using two bonded 1024 QAM channels can allow 100 Mbps to be utilized to deliver the MPEG packets to the user. The user can generally begin viewing the MPEG packets immediately upon their transmission.

Tuners 770*a* and 770*b* (hereinafter 770) receive the MPEG packets via bonded channels 750*a* and 750*b*, respectively. The settop box 760 combines the MPEG packets from the bonded channels 750 and provides the MPEG packets to a user at user device 780. For instance, the user device 780 can include a memory 790. In an embodiment, the playback rate at the user device 780 is 3.5 Mbps or other variable bit rate (VBR) buffer model rate, though the bonded channels 750 may facilitate much higher downstream transmission rates. This can cause the memory 790 to fill up more quickly, allowing personal video recorder (PVR) functions to be realized locally rather than via the HFC network 106. The bonded channels 750 can be emptied more quickly, allowing greater utilization of the channels 750. According to an embodiment, the overall impact to other users of the channels 750 is reduced by using bonded channels 750 and allocating a smaller amount of bandwidth on each channel 750 to the burst.

The use of bonded channels 750 generally provide a statistical multiplexing gain because the additional bandwidth is treated as a large single channel for the download. According to an embodiment, the bonded channels 750 are slightly less efficient than a single large channel. The statistical multiplexing gain may be dependent on the bandwidth of the channel, the burstiness of the traffic, the number of users, and assumptions of quality of service (QoS) for the traffic, to provide some examples. The expected gain from use of the bonded channels 750 can be determined using a communication network simulation tool, such as OPNET (published by OPNET Technologies, Inc. of Bethesda, Md.).

VOD content transmission generally can be modeled assuming variable bit rate (VBR) streams of VOD content at 1.0-3.5 Mops over the same modulation orders and bonding. Modelling the VOD content transmission can show statistical multiplexing gain for normal MPEG delivery.

According to an embodiment, the CMTS 720 transmits the VOD content using file transfer protocol (FTP). For example, a 75-90 minute video can be transferred at 1.0-3.5 Mbps using FTP. Assuming that a faster transmission rate is desired, the simulation tool can be used to determine how many streams (i.e. simultaneous users) can be supported using a single 64 QAM, 256 QAM, or 1024 QAM channel, to provide some examples. For instance, the simulation tool can determine how many streams can be supported when 2, 3, or 4 channels are bonded. 5×, 10× and 20× data rates can be assumed.

Figure 8:
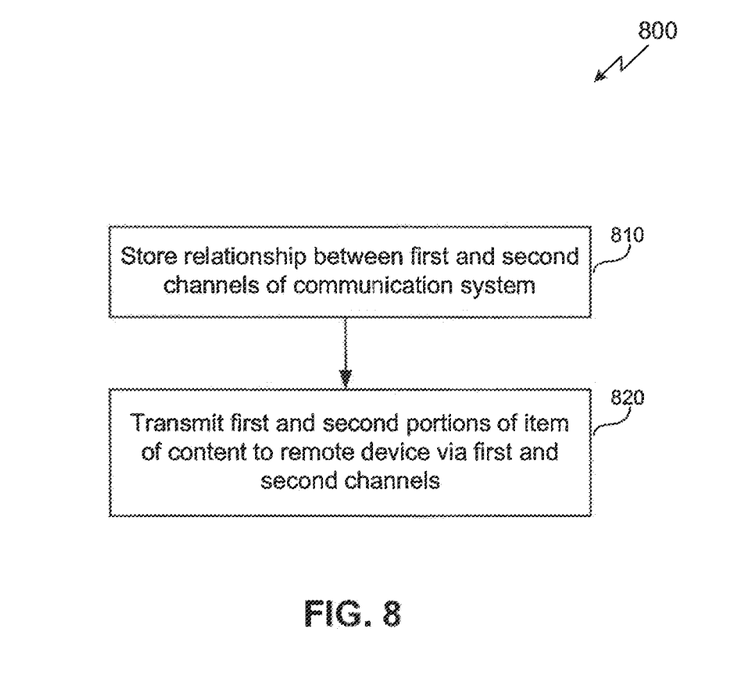
FIG. 8 illustrates a flow chart for a first method according to an embodiment of the present invention.
Figure 9:
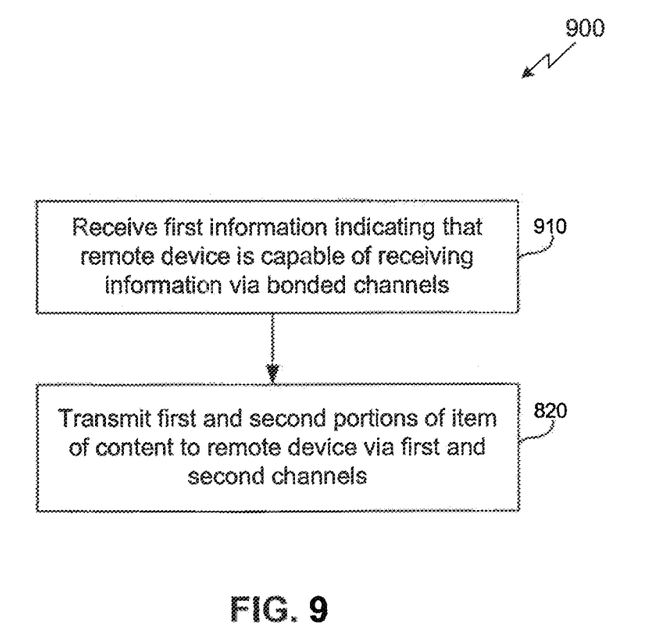
FIG. 9 illustrates a flow chart for a second method according to an embodiment of the present invention.
Figure 10:
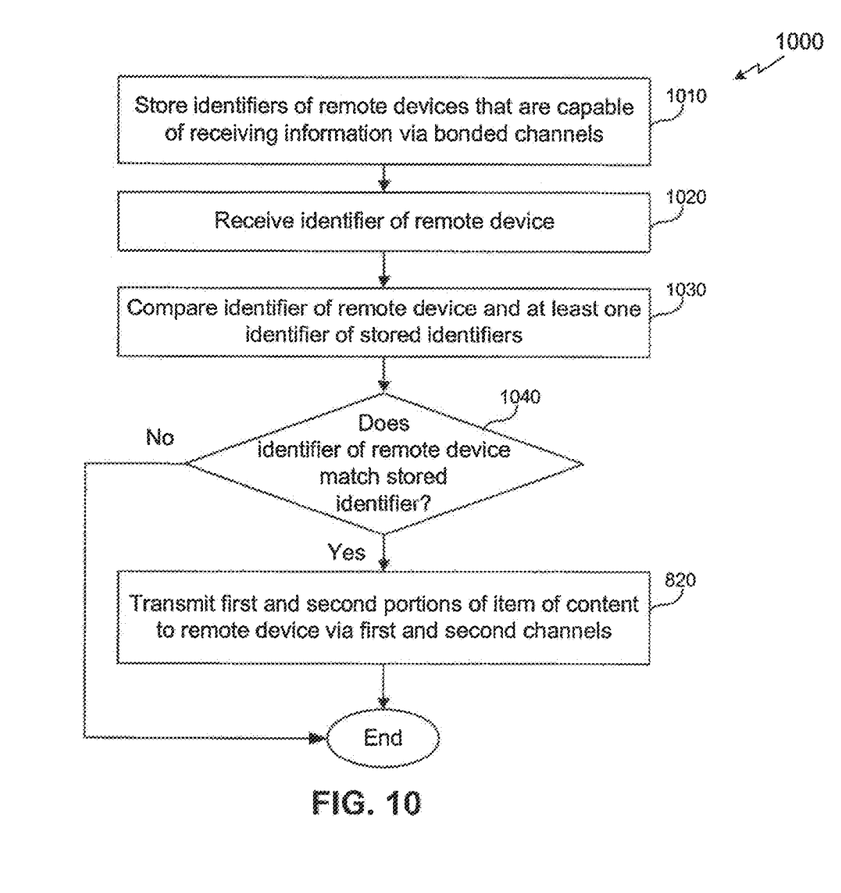
FIG. 10 illustrates a flow chart for a third method according to an embodiment of the present invention.

FIGS. 8, 9, and 10 illustrate flowcharts of methods for transmitting portions of an item of content via bonded channels according to embodiments of the present invention. The invention, however, is not limited to the description provided by the flowcharts 800, 900 or 1000. Rather, it will be apparent to persons skilled in the relevant art(s) from the teachings provided herein that other functional flows are within the scope and spirit of the present invention.

Flowcharts 800, 900, and 1000 will be described with continued reference to example communication systems 100, 500, 600, and 700 described above in reference to FIGS. 1, 5, 6, and 7, respectively. The invention, however, is not limited to these embodiments.

Referring to FIG. 8, a relationship between first and second channels of a communication system 100, 500, 600, or 700 is stored at block 810. For example, a headend 102, 710 or a CMTS 104, 720 can include a memory to store information indicating that the first and second channels are to be bonded. At block 820, the headend 102, 710 transmits first and second portions of an item of content to a remote device that is capable of receiving items of content via multiple channels. For example, the remote device can be a user device 110, 780. The video modulators 730 can transmit the first and second portions of the item, based on the relationship between the first and second channels.

The item of content can include packets. In an embodiment, the headend 102, 710, the CMTS 104, 720, the CMTS MAC 310, or some other element of the CMTS 104, 720 or the headend 102, 710 can parse the packets to provide MPEG packets. The first and second portions of the item of content can be first and second MPEG packets, for example. The CMTS 104, 720 or the headend 102, 710 can simultaneously enqueue the first and second MPEG packets to be transmitted to the remote device.

The modulators 730 generally transmit the item of content via the first and second channels more quickly than the modulators 730 are capable of transmitting the item via the first or second channel alone. The modulators 730 can transmit the item of content at a rate that is faster than the playback rate of the communication system 100, 500, 600, or 700. For example, a memory 790 of a user device 780 can store the item of content faster than a user can view the item.

Referring to FIG. 9, information is received at block 910 indicating that the remote device is capable of receiving other information via bonded channels. For instance, the CMTS 104, 720 can receive an indicator from a settop box, a cable modem, etc. indicating that the remote device is configured to receive information via multiple downstream channels concurrently. The CMTS 104, 720 can store the information received at block 910 for subsequent retrieval. Portions of the item of content can be transmitted at block 820, based on the information received at block 910 for example.

Referring to FIG. 10, identifiers of remote devices that are capable of receiving information via bonded channels are stored at block 1010. For instance, the headend 102, 710 can include a memory that stores the identifiers. In an alternative embodiment, a memory of the communication system 100, 500, 600, or 700 stores, identifiers of remote devices that are not capable of receiving information via bonded channels. In the embodiment of the FIG. 10, the headend 102, 710 receives the identifiers of the remote devices at block 1020. A comparing element compares at block 1030 the identifier of the remote device and at least one of the stored identifiers. The comparing element can be the CMTS MAC 310, the CMTS 104, 720, the video server 740 or some other element of the CMTS 104, 720 or the headend 102, 710, to provide some examples.

In the embodiment of FIG. 10, if the identifier of the remote device matches a stored identifier, as determined at diamond 1040, then the headend 102, 710, the CMTS 104, 720, or the video modulators 730 transmit first and second portions of the item of content to the remote device via the first and second channels at block 820. Otherwise, the item of content is generally transmitted via a single channel.

According to the alternative embodiment, the first and second portions of the item of content are transmitted to the remote device via the first and second channels if the identifier of the remote device does not match a stored identifier.

Figure 11:
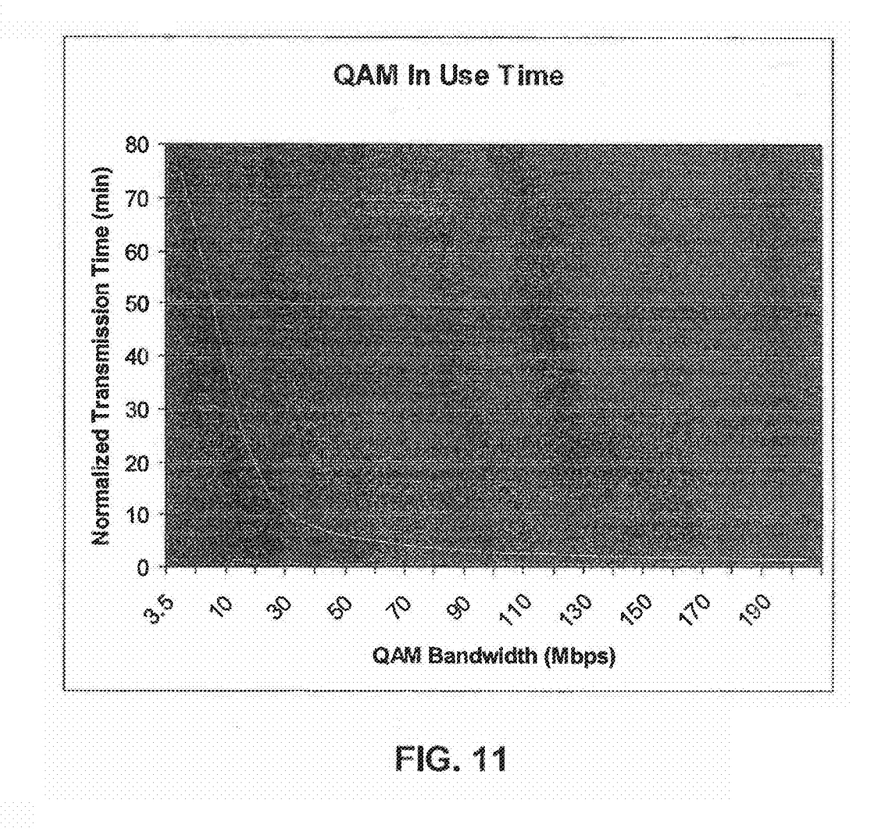
FIG. 11 illustrates a relationship between the time needed to download a typical VOD file and the bandwidth allocated for the download according to an embodiment of the present invention.

FIG. 11 illustrates a relationship between the time needed to download a typical VOD file and the bandwidth allocated for the download according to an embodiment of the present invention. Referring to FIG. 11, the "sweet spot" in transfer time occurs at a bandwidth of approximately 40 Mbps. For instance, bursting a typical file to a personal video recorder (PVR) disk at 40 Mbps generally takes approximately 10 minutes. Because a user can start watching content of the VOD file while it is being recorded, viewing can often commence immediately, with full skip ahead capability being available within approximately 10 minutes. The ability to skip ahead through the first commercial can be available in seconds. Other trick modes often can be available immediately. The amount of time needed for trick mode availability is system dependent. For instance, the amount of time can be $\frac{1}{10}^{th}$ the playback time.

As shown in FIG. 11, bonding channels of the communication system 100, 500, 600, or 700 can provide high speed downloading of content, such as video content, far in excess of the playback rate. Using bonded channels relaxes the QoS requirements of a data stream, such as a video stream, over an inter-let protocol (IP) network, according to an embodiment. With respect to network capacity and QoS, bonding channels can eliminate or reduce costly network PVR functionality common for on-demand services.

CONCLUSION

Example embodiments of the methods, systems, and components of the present invention have been described herein. As noted elsewhere, these example embodiments have been described for illustrative purposes only, and are not limiting. Other embodiments are possible and are covered by the invention. Such other embodiments will be apparent to persons skilled in the relevant art(s) based on the teachings contained herein. Thus, the breadth and scope of the present invention should not be limited by any of the above described exemplary embodiments, but should be defined only in accordance with the following claims and their equivalents.

What is claimed is:

1. A method, comprising:
  receiving a request to access an item of content using a communication system;
  establishing a relationship between a first channel and a second channel; and
  sending, at a faster rate than the item of content can be viewed on a user device of the communication system, a first portion of the item of content and a second portion of the item of content to a modem using the communication system via the first channel and the second channel, respectively, to enable, based on the faster rate, a trick mode for playback of the item of content.

2. The method of claim 1, wherein the item of content comprises:
  video on demand content.

3. The method of claim 1, wherein the enabled trick mode is a skip ahead capability.

4. The method of claim 1, wherein the item of content comprises:
  a movie or a television show.

5. The method of claim 1, wherein the sending comprises: using a wireless link to send the first portion and the second portion.

6. The method of claim 1, wherein the sending comprises: sending the first portion and the second portion via the first and second channels concurrently.

7. The method of claim 1, wherein the relationship between the first channel and the second channel comprises: a bonded channel relationship.

8. The method of claim 1, further comprising: sending an indicator that describes the relationship to the modem.

9. The method of claim 1, wherein the sending comprises: sending a first MPEG packet via the first channel and sending a second MPEG packet via the second channel.

10. An apparatus, comprising:
a transmitter configured to transmit a request to access an item of content using a communication system, the communication system being configured to provide the item of content according to a relationship between a first channel and a second channel; and
a receiver configured to receive, at a faster rate than the item of content can be viewed on a user device, a first portion of the item of content and a second portion of the item of content from the first and the second channel, respectively, to enable, based on the faster rate, a trick mode for playback of the received item of content.

11. The apparatus of claim 10, wherein the first portion and the second portion comprise:
a portion of video on demand content.

12. The apparatus of claim 10, wherein the trick mode is a skip ahead capability.

13. The apparatus of claim 10, wherein the first portion and the second portion comprise:
a portion of a movie or a television show.

14. The apparatus of claim 10, wherein the receiver is further configured to receive the first portion and the second portion concurrently.

15. The apparatus of claim 10, wherein the relationship comprises:
a bonded channel relationship between the first channel and the second channel.

16. The apparatus of claim 15, wherein the bonded channel relationship between the first and second channels is capable of being used by the apparatus.

17. The apparatus of claim 10, wherein the first portion comprises: a first MPEG packet, and
wherein the second portion comprises: a second MPEG packet.

18. The apparatus of claim 10, wherein the receiver is further configured to receive the first portion and the second portion using a wireless link.

19. A method, comprising:
receiving a request to access an item of content from a remote device;
establishing a relationship between a first channel and a second channel to the remote device;
accessing the item of content; and
transmitting a first portion of the item of content and a second portion of the item of content to the remote device via the first channel and the second channel, respectively, based on the relationship, to enable a trick mode for playback of the item of content.

20. The method of claim 19, wherein the trick mode comprises:
a skip ahead capability.

* * * * *